United States Patent [19]
Culver

[11] 3,740,856
[45] June 26, 1973

[54] FLEXURE MOUNTING FOR FRICTION WHEEL MEASURING DEVICES
[75] Inventor: Irven H. Culver, Playa Del Rey, Calif.
[73] Assignees: Primus Mfg., Inc., San Lorenzo, P.R.; Southwestern Industries, Inc., Los Angeles, Calif.
[22] Filed: July 2, 1971
[21] Appl. No.: 159,201

Related U.S. Application Data
[63] Continuation-in-part of Ser. No. 67,379, Aug. 27, 1970, which is a continuation-in-part of Ser. No. 9,872, Feb. 8, 1970.

[52] U.S. Cl. .......................................... 33/141 R
[51] Int. Cl. ............................................. G01b 3/12
[58] Field of Search ............................. 33/125, 141; 267/160

[56] References Cited
UNITED STATES PATENTS
3,311,985  4/1967  Hodge .............................. 33/141 A
1,038,770  9/1912  Locke ............................... 33/147 C Primary Examiner—Harry N. Haroian
Attorney—Hayden A. Carney

[57] ABSTRACT

A mounting and biasing mechanism for maintaining an essentially constant tracking force between a frictionally driven wheel and a measurement surface, along which the wheel rolls, is described. The mechanism includes a base member and a carrier member having resilient means operatively coupled between them for biasing the carrier member relative to the base member along a predetermined path of movement defined for the carrier member. The predetermined path of movement of the carrier member is defined by flexure means connected between the base and carrier members. The flexure means is arranged to define three spaced laterally deflectable columns, aligned normal to the path of movement between the base and carrier members, to provide three essentially frictionless, highly compliant points of connection between the base and carrier members.

10 Claims, 7 Drawing Figures

PRIOR ART

INVENTOR.
IRVEN H. CULVER

BY
Christie, Parker & Hale
ATTORNEYS

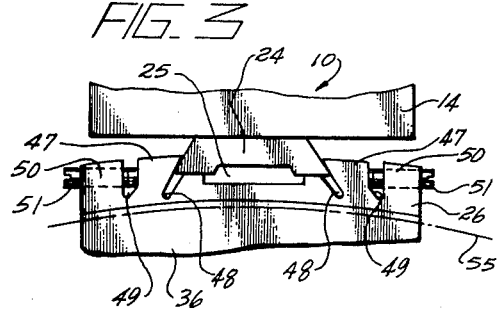
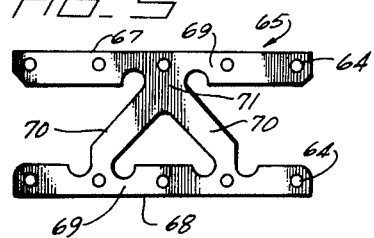
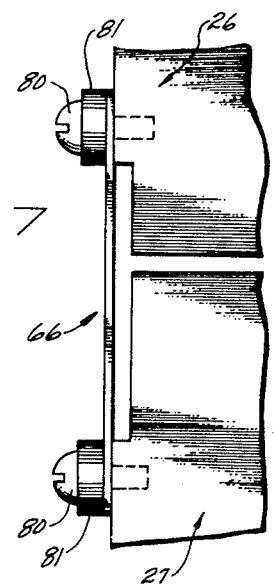
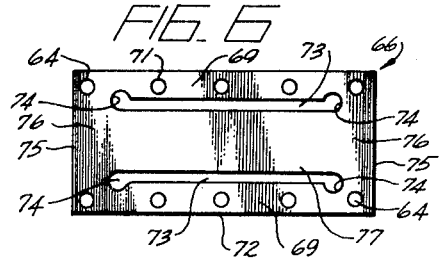
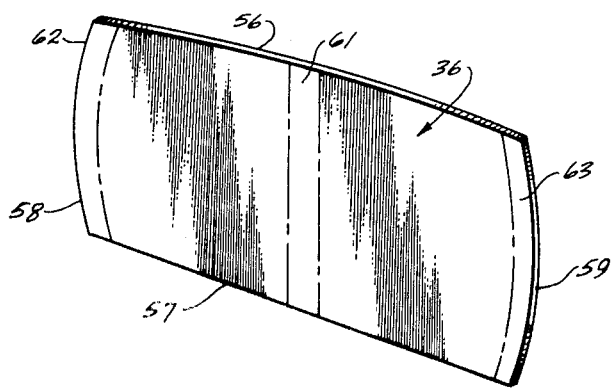

FLEXURE MOUNTING FOR FRICTION WHEEL MEASURING DEVICES

CROSS-REFERENCE TO RELATED APPLICATIONS

This application is a continuation-in-part of copending application Ser. No. 67,379 filed Aug. 27, 1970 as a continuation-in-part of application Ser. No. 9,872 filed Feb. 8, 1970.

It is believed that full understanding of this invention will be facilitated by reference to U.S. Pat. Nos. 3,307,265, 3,378,929, 3,561,120 and 3,561,121. U.S. Pat. Nos. 3,307,265 and 3,378,929 and 3,561,121, in combination with each other, describe the presently preferred form of the commonest type of measuring device with which this invention has utility. U.S. Pat. No. 3,561,120 describes a presently preferred alignment method with which a mounting assembly according to this invention may be used.

BACKGROUND OF THE INVENTION

This invention pertains to precision distance and related measurements through the use of friction wheel measuring devices. More specifically, this invention pertains to an improved assembly for mounting the measuring device for tracking of the frictionally driven wheel thereof along a measurement surface with essentially constant tracking force.

DESCRIPTION OF THE PRIOR ART

A widely used friction wheel measuring device is described in U.S. Pat. No. 3,378,929. A common use of friction wheel measuring devices is in combination with machine tools where the devices are used to measure the distance one part of a machine tool is moved relative to another part of the tool. For example, a friction wheel measuring device is often mounted to a lathe carriage to engage a guideway surface of the lathe bed to measure the distance the carriage is moved along the lathe bed. Such devices, however, are not restricted to use on lathes and have in fact found many other uses including uses in other types of machine tools, in coordinate measuring machines, in diameter measuring systems, and in systems for measuring angles around the center of a rotary table or other cylindrical member.

In order that friction wheel measuring devices of the type described in U.S. Pat. No. 3,378,929 may be used to produce measurements in which confidence may be placed, it is necessary that the device operate to produce both accurate measurements and repeatable measurements. Measurement accuracy is achieved principally by the precision with which the components of the measuring device are fabricated. Measurement accuracy is also achieved by use of the structures and techniques described in U.S. Pat. Nos. 3,307,365 and 3,561,121, for example. Measurement accuracy is achieved when the measurement produced by the device as the friction wheel tracks a given distance over the measurement surface is exactly the same as the extent of the given distance.

A repeatability error, on the other hand, is a failure of the measuring device to read "zero" when returned to a "zero postiion" after several cycles of motion away from and back to the "zero position" on the measurement surface, preferably under conditions where each cycle involves plural rotations of the friction wheel. It has been ascertained that repeatability errors are produced primarily by the environment of the measuring device rather than by any deficiencies in the device itself. Lack of repeatability can be quite troublesome when the measuring device is used in the machining of a complex part on a large machine tool, which machining process may require several days' work by a skilled machinist.

It has been found that repeatability errors are generated primarily by non-reciprocal deflections produced in the components of the machine tool with which the measuring device is used, which components were formerly thought to be absolutely rigid, and also by similar non-reciprocal deflections in the supporting bracketry and mounting assemblies provided for the measuring device; the latter deflections are produced as second order effects of the non-reciprocal deflections encountered in the structure of the machine tool. Such deflections admittedly are very slight, but they are sufficient in magnitude to produce repeatability errors in a friction wheel measuring device operated cyclically over long distances of travel.

The nature of the non-reciprocal deflections productive of repeatability errors is described more fully in U.S. Pat. No. 3,561,120. Briefly summarized, however, repeatability errors are produced by one or more of three causative factors: (1) tracking of the friction wheel skew to the direction of gross relative movement between a lathe bed and a lathe carriage, for example; (2) variations in the pitch of the metering wheel relative to the measurement surface; and (3) variations in the force of engagement of the metering wheel with the measurement surface. Variations in the pitch of the metering wheel are significant because it is preferred that the peripheral surface of the wheel be defined as a portion of a sphere rather than as a portion of right circular cylinder for the reasons described in U.S. Pat. Nos. 3,307,265 and 3,561,121.

The mounting mechanisms initially used with friction wheel distance measuring devices are typified by the mounting mechanism described in U.S. Pat. No. 3,378,929. These initial mounting mechanisms were characterized by the use of stiff springs which were biased to provide the desired wheel tracking and engagement force. In any spring, the force developed by the spring is equal to the effective stiffness of the spring times the amount of deflection of the spring. If the spring has high stiffness, a small deflection of the spring corresponds to a large force being developed by the spring or applied to the spring.

It has long been recognized that repeatable and accurate measurements are produced by friction wheel measuring devices when the measuring device is free from changes in the attitude of the friction wheel relative to the measurement surface during the measurement process. Changes in this attitude result when the measuring device moves in response to deflections in the machine tool and in the mounting assembly used to connect the measuring device to the machine tool. These deflections are in turn produced by variations in the forces applied to the machine tool and to the mounting mechanisms.

Once the above-listed causative factors of repeatability errors were identified, the mounting mechanism described in copending application Ser. No. 67,379 was developed. This improved mounting mechanism provides the desired tracking force between the friction wheel and the measurement surface by the use of a spring which develops essentially constant force when subjected to substantial deflection; specifically, the biasing spring of this improved mounting mechanism is provided in the form of a resilient column preloaded to a load exceeding the critical load of the column. The result is that the effective biasing force manifested between the friction wheel and the measurement surface is essentially constant throughout substantial relative movement of the parts of the mounting mechanism between which the column spring is engaged.

The basic objective sought to be achieved in the structure of the improved mounting mechanism described in copending application Ser. No. 67,379 is to provide a mounting mechanism which is stiff in five of the six modes of orthogonal motion, but which is soft in the sixth mode of such motion. The six modes of orthogonal movement are movements linearly along each of three orthogonal axes and movements angularly about each of the three orthogonal axes, i.e., the conventional mutually perpendicular X, Y and Z axes. Specifically, the mounting mechanism described in application Ser. No. 67,379 is arranged in use so that the permitted single degree of motion is linearly along a line normal to the measurement surface.

It has been found that the mounting mechanism described in application Ser. No. 67,379 has a susceptibility to softness, i.e., to internal deflection, in response to moments applied to it about the axis along which linear motion is permitted. Such deflections of the mounting mechanism result in the generation of the first causative factor listed above concerning repeatability errors.

SUMMARY OF THE INVENTION

This invention provides an improved mounting mechanism of the basic type described in copending application Ser. No. 67,379 and is addressed to the same basic objective so that identified above, namely, the production of a mounting mechanism which is stiff in five of the six modes of orthogonal motion but which is soft and compliant to deflections and movements in the sixth mode. The present mounting mechanism achieves this objective to a considerably greater extent than was achieved by the mounting mechanism described in application Ser. No. 67,379. Thus, the present mounting mechanism provides all of the benefits and advantages heretofore provided by the mounting mechanism described in Ser. No. 67,379 without the above-described disadvantage recently discerned in this prior mounting mechanism. The present mounting mechanism is stiff to deflections corresponding to the one mode of undesired movement which is most troublesome to measurement accuracy and repeatability.

Generally speaking, this invention provides a mounting assembly for a friction wheel measuring device and includes a base member adapted to be mounted to one of two relatively movable elements to the other of which the measuring device is to be engaged. The mounting assembly also includes a carrier member disposed adjacent the base member and defining means for releasably clamping a measuring device thereto. Resilient means are operatively coupled between the base member and the carrier member for biasing the carrier member relative to the base member along a predetermined path of movement defined for the carrier member. The mounting assembly further includes flexure means which are connected between the base and carrier members for defining the path of permitted movement between the members and for restricting relative movement between the base and carrier members to movement along the predetermined path during normal conditions of use of the mounting assembly. The flexure means also defines three spaced, essentially frictionless points of connection between the base and carrier members.

BRIEF DESCRIPTION OF THE DRAWINGS

The above-mentioned and other features of the invention are more fully set forth in the following detailed explanation and description of a presently preferred embodiment of the invention, which explanation and description is presented with reference to the accompanying drawings wherein:

FIG. 1 is presented in furtherance of an explanation of the problem overcome by this invention;

FIG. 3 is a view similar to that of FIG. 2 illustrating the source of the problem overcome by this invention;

FIG. 4 is a perspective view of one of the identical flexure plates encountered in the mounting mechanism of FIG. 1 as deflected in response to the condition illustrated in FIG. 3;

FIG. 5 is an elevation view of one of the presently preferred improved flexure plates of a mounting assembly according to this invention;

FIG. 6 is an elevation view of the other of the presently preferred flexure plates of a mounting assembly according to this invention; and FIG. 7 is an enlarged cross-sectional elevation view illustrating the connection of the present flexure plates to the structure of the mounting assembly.

DESCRIPTION OF THE ILLUSTRATED EMBODIMENT

Figure 1:
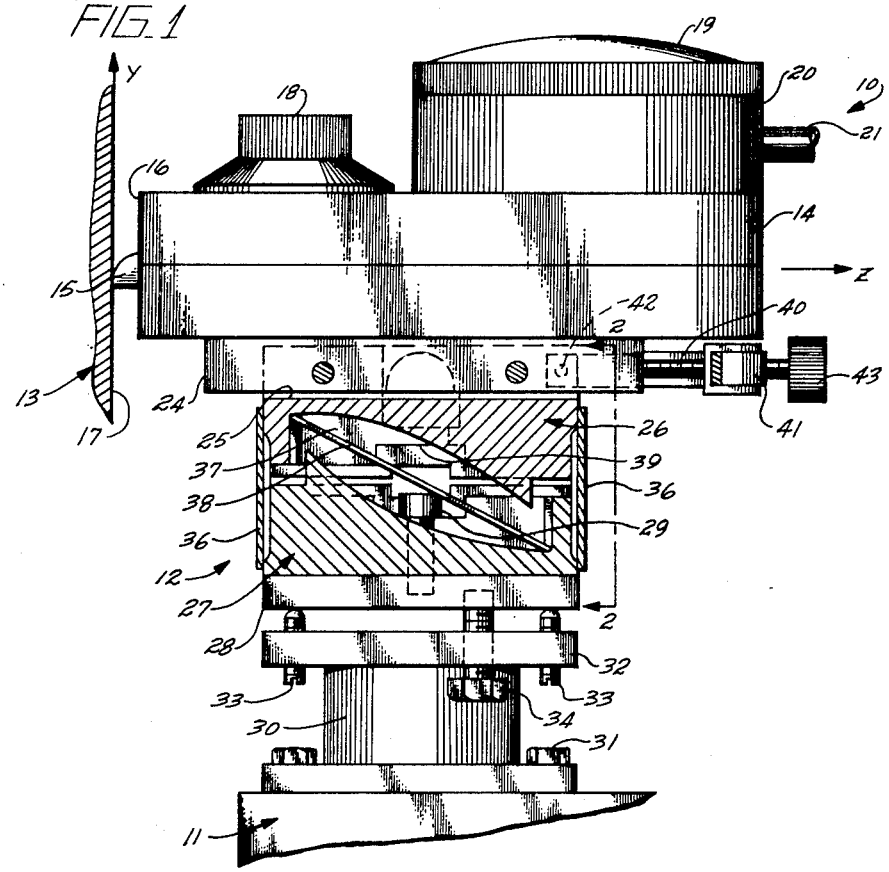
FIG. 1 is an elevation view, partially in section, showing a mounting mechanism according to the description of application Ser. No. 67,379.

FIG. 1 illustrates the mounting of a friction wheel measuring device 10 to a lathe carriage 11, for example, by a mounting assembly 12 according to the disclosure of application Ser. No. 67,379 so that the measuring device functions to measure the distance which the lathe carriage moves relative to a lathe bed 13. The direction in which the carriage moves along the lathe bed is referred to herein as the direction of gross relative movement of the measuring device. The measuring device includes a housing 14 within which is rotatably mounted a circular metering wheel 15 of controlled circumferential characteristic. The periphery of the metering wheel preferably has a curved profile, as shown, for the reasons set forth in U.S. Pat. No. 3,561,121. The metering wheel is mounted in the housing so that, during use of measuring device 10, the rim of the wheel projects through a front face 16 of the housing and frictionally contacts a measurement surface 17 defined by the lathe bed and along which measurements are to be made of the amount of travel of the lathe carriage relative to the bed.

A gross measurement indicator dial 18, calibrated in any desired measurement scale such as inches, is disposed on the upper surface of housing 14 and is coupled directly to the shaft (not shown, but see U.S. Pat. No. 3,378,929) which supports the metering wheel. A fine measurement indicator 19 for indicating small increments of measured travel is also mounted to the upper surface of the housing. Indicator 19 includes a dial plate (not shown), calibrated, for example, in hundredths and thousandths of an inch, and a rotatable pointer (not shown) which cooperates with the dial plate and which is coupled to the metering wheel via an anti-backlashed motion amplifying gear train (not shown), for example; see U.S. Pat. No. 3,378,929. Any angular movement of the metering wheel is immediately manifested by indicators 18 and 19 which, in combination, serve to indicate the distance which the metering wheel has travelled along the measurement surface.

A photo-electric signal generator 20 is located between indicator 19 and housing 14 coaxially of the output shaft of the gear train. Signal generator 20 operates in response to rotation of wheel 15 to generate a series of signals which correspond to discrete increments of the distance which wheel 15 rolls along measurement surface 17 during the measurement process. The signals developed in signal generator 20 are supplied via a suitable cable 21 to a remote display panel (not shown). It is within the scope of this invention that measuring device 10 may be provided in a form which does not include signal generator 20 or in a form which does not include visual indicators 18 and 19; in the former case the measuring device has no remote readout capacity, whereas in the latter case the device has no capacity to present a measurement readout at the location of housing 14.

A male dovetail member 24 is secured to the underside of housing 14 and has its length aligned parallel to the elongate extent of housing 14, which extent is also preferably disposed perpendicular to measurement surface 17 during use of the measuring device. The male dovetail member is slidably positioned in a female dovetail groove 25, see FIG. 3, provided in the upper surface of a carrier member 26 of mounting assembly 12. Carrier member 26 forms the upper one of two major components of mounting assembly 12. The other major component of the mounting assembly is defined by a base member 27 which has its lower surface mounted to a plate 28 by bolts 29.

The lower end of a mounting pedestal 30 is securely fastened to lathe carriage 11 by bolts 31. The upper end of the pedestal defines a peripheral flange 32. A pair of set-screws 33 are threaded through flange 32 along a line perpendicular to measurement surface 17 to abut, but not penetrate, the lower surface of plate 28. Flange 32 is coupled to plate 28 by a pair of bolts 34, only one of which is shown, located along a line parallel to the measurement surface. Screws 33 are adjustable in flange 32 to vary the pitch of the plane of rotation of wheel 15 relative to measurement surface so that the effective circumference of wheel 15 relative to its maximum circumference may be selected for the reasons set forth in U.S. Pat. Nos. 3,307,265 and 3,561,121. Bolts 34 are adjustable in flange 32 to vary the tilt of measuring device 14 about its longitudinal axis, thereby to define the precise corrective angle of skew tracking of the metering wheel relative to the direction of gross relative movement of the measuring device along measurement surface 17 during the measurement process; the nature of and reason for this adjustment is described in U.S. Pat. No. 3,561,120.

A pair of thin spring-metal flexure plates 36 interconnect the adjacent ends of carrier member 27 and base member 27 to couple the members to each other for movement of the members relative to each other only along a line normal to the measurement surface, i.e., along a line parallel to the length of male dovetail member 24. The flexure plates are so interconnected between the carrier and base members of mounting assembly 12 that the members are spaced from each other by the flexure plates. The lower surface of carrier member 26 and the upper surface of base member 27 are configured to define a cavity 37 between them when the members are secured to each other, as shown, by flexure plates 36.

Disposed within cavity 37 is an elongate sheet 38 of spring metal which has its opposite ends in abutting, but not fixed, contact with the lower portions of carrier member 26 adjacent measurement surface 17 and with the upper extent of mounting member 27 remote from the measurement surface, i.e., adjacent the rear of the mounting assembly. In other words, the resilient sheet 38 is loaded as a column and is therefore referred to herein as a column spring or an Euler spring. The column spring is arranged within cavity 37 so that a line between its ends is more nearly parallel to the length of male dovetail 24 than perpendicular to the male dovetail. Windows 39 are provided through the carrier and base members of the mounting assembly on either side of the column spring to allow a machinist or other user of the mounting assembly to view deflections in the column spring.

The rear end of male dovetail member 24 is engageable in abutting relation with a screw 40 which is mounted in a substantially rigid non-resilient U-shaped yoke 41, the ends of which are pivoted at 42 to the rear end of carrier member 26 on opposite sides of female dovetail groove 25. Screw 40 is rotatable by manual operation of a knob 43 carried by the screw rearwardly of yoke 41.

Figure 2:
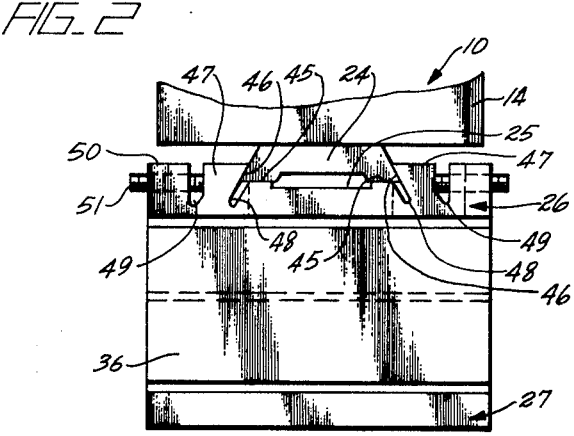
FIG. 2 is an elevation view taken along line 2—2 in FIG. 1.

As shown in FIG. 2, each of flexure plates 36 is provided as a rectangular piece of thin spring metal. As shown in FIG. 1, flexure plates 36 are disposed parallel to each other. When mounting assembly 12 is properly installed on lathe carriage 11, flexure plates 36 lie essentially parallel to measurement surface 17 adjacent the point at which the periphery of friction wheel 15 engages the measurement surface. It is apparent therefore that flexure plates 36 prevent carrier member 26 from moving linearly toward or away from base member 27, i.e., the flexure plates prevent the base and carrier members from moving linearly along the line defined as the Y axis; see FIG. 1. Also, the flexure plates prevent carrier member 26 from moving laterally relative to base member 27 along a line defined parallel to the X axis which corresponds to the direction of the gross relative movement of measuring device 10 along measurement surface 17; that is, the flexure plates prevent the carrier member from moving in a direction parallel to the planes of flexure plates 36 and parallel to the plane of rotation of metering wheel 15. Further, the flexure plates prevent the base and carrier members from moving angularly relative to each other about lines parallel to either of the X or Y axes; they also function to inhibit angular movement of the carrier member about lines parallel to the Z axis. On the other hand, because the flexure plates are fabricated of thin resilient metal and are secured to the carrier and base members along only their upper and lower edges, respectively, it is apparent that the flexure plates permit the carrier member to move laterally relative to the base member along a line parallel to the Z axis; the Z axis is defined normal to the measurement surface at the point of contact of the friction wheel with the measurement surface. Thus, from the foregoing it is apparent that the flexure plates, by reason of their geometry and disposition in mounting assembly 12, should constrain the carrier member from movement relative to the base member in five of the six modes of orthogonal motion possible, but permit and are soft to movement of the carrier member relative to the base member in the sixth mode of orthogonal movement, i.e., linear movement parallel to the Z axis. (In reality, as shown below, flexure plates 36 exhibit an undesired softness to angular movement of the carrier member about a line parallel to the Z axis, and this undesired softness is eliminated by the improved mounting assembly described below.)

Column spring 38 is defined so that its critical load (see for example, *Elements of Strength of Materials* by Timoshenko and MacCullough, one volume, D. Van Nostrand Company, Inc., New York, third edition, 1949, pp. 288–291) has a magnitude which is only slightly less than the desired force of tracking engagement of friction wheel 15 against measurement surface 17.

In use of mounting assembly 12, measuring device 10 is engaged to the mounting assembly by engaging male dovetail 24 in female dovetail groove 25, by sliding the measuring device toward the measurement surface until the friction wheel 15 engages the measurement surface, by engaging the forward end of screw 40 with the rear end of male dovetail 34, and then by tightening down knob 43 to, in effect, pull carrier member 26 rearwardly along male dovetail 24. Such operation of knob 43 causes a compressive load to be applied to column spring 38. When this compressive load reaches the critical load of the column spring, the column spring buckles; thereafter, operation of knob 43 causes carrier member 36 to be moved rearwardly parallel to the Z axis relative to base member 27 while the reactive force applied by the buckled column spring to the carrier member remains essentially constant. That is, once the column spring has been buckled, it applies substantially constant force between the carrier and base members throughout substantial increments of movement of these members relative to each other. It is apparent, therefore, that the force applied by the column spring, via carrier member 26 and housing 14, to urge friction wheel 15 into contact with measurement surface 17 is an essentially constant force throughout substantial increments of movement of measuring device 10 along the Z axis relative to the measurement surface.

In use, knob 43 is operated about one or two turns after column spring 38 first buckles so that a predetermined amount of buckle is imposed into the column spring before male dovetail member 24 is locked into position in female dovetail groove 25 in the manner described below. Thereafter, no relative movement between housing 14 and carrier member 26 is possible; measuring device 10 may then be operated to perform the desired measurements after the alignment process described in Patent No. 3,561,120 has been completed.

FIG. 2 shows that the configuration of female dovetail groove 25, in the upper extent of carrier member 26, includes a pair of upwardly open land surfaces 45 along opposite sides of the groove for registry with the lower surfaces of male dovetail 24. The side walls 46 of groove 25 slope upwardly toward each other and are defined by the opposing surfaces of a pair of laterally deflectable locking gibs 47 formed in the upper extent of carrier member 26. Thus, each gib 47 is defined between a groove 48 which extends into the carrier member between dovetail groove side wall 46 and land surface 45. The opposite lateral boundary of each gib 47 is defined by a groove 49 formed in the upper surface of the carrier member parallel to but inwardly from the sides of the carrier member. The result is that the base of each gib 47 is of reduced width which is selected so that the gib is laterally deflectable like a cantilevered beam about its base between the bottoms of grooves 48 and 49. A rib 50 is defined between each groove 49 and the adjacent side of the carrier member. A setscrew 51 is threaded through each rib 50 adjacent each end thereof into abutting engagement with the adjacent surface of gib 47. It is apparent, therefore, that as screws 51 are turned to advance into ribs 50, the ends of the screws apply a lateral force to locking gibs 47 causing the gibs to deflect toward dovetail groove 25. Setscrews 51 therefore are operable to cause the male dovetail 24 to be securely yet releasably clamped in female dovetail groove 25 after the desired degree of buckle has been imposed upon column spring 38 in the manner described above.

Mounting assembly 12, shown in FIGS. 1 and 2 and described above, is in accord with the disclosures of copending application Ser. No. 67,379. The structure described above does not reflect the improvement made by this invention. The improvement provided by this invention resides in a modification of flexure plates 36 of mounting assembly 12. The structure shown in FIGS. 1 and 2 has been described above in detail so that the nature of the problem overcome by this invention may be understood, and so that the significance of the improvement provided by this invention may be fully appreciated.

The problem solved by this invention arises as locking gibs 47 are tightened against the side walls of male dovetail 24 in response to the turning of setscrews 51. It is desired that male dovetail 24 be securely and rigidly clamped within female dovetail groove 25. To accomplish this, substantial force must be applied by gibs 47 to the side walls of male dovetail 24, and this force necessarily must have a reaction force in the structure of carrier member 26. This situation is illustrated in FIG. 3 which shows, in grossly exaggerated form for the purposes of illustration, that as screws 51 are tightened against the outer surfaces of gibs 47, grooves 48 and 49 tend to open as gibs 47 tend to react away from dovetail 24 and as ribs 50 tend to react away from gibs 47 in response to the force applied by screws 51 to the outer surfaces of the gibs. The necessary effect of these deflections, occurring in the upper portions of the structure of carrier member 26, is to induce the carrier member to buckle so that the normally horizontal upper edge of flexure member 36 is induced to assume a curvature (represented by arc 55 in FIG. 3) concave to the upper surface of base member 27. In other words, the reaction forces developed in carrier member 26 by reason of securely clamping measuring device 10 to the carrier member causes the carrier member to tend to buckle in such manner that the outer edges of the carrier member move downwardly relative to the center of the carrier member. Such buckling of the carrier member can occur only if flexure plates 36 deflect to accommodate this displacement of the outer edges of the carrier relative to the center portions of the carrier member; such deflection of flexure plates 36 of a mounting assembly according to disclosures of copending application Ser. No. 67,379 is illustrated in FIG. 4.

As shown in FIG. 4, each of flexure plates 36 of mounting assembly 12 have upper, lower and opposite side edges 56, 57, 58 and 59, respectively. As carrier member 26 tends to buckle or deflect in the manner illustrated in FIG. 3, the center of flexure plate top edge 56 tends to move upwardly relative to its ends. Because the lower edge of flexure plate 36 is securely connected along its length to base member 27, as shown in FIG. 2, flexure plate edge 57 tends to remain straight. The result is that flexure plate 36 is induced to buckle along its side edges 58 and 59, but to remain straight and unbuckled intermediate side edges 58 and 59; this condition is shown in FIG. 4. The character of the deflection of carrier plate 26, as shown in FIG. 3, acts in the manner shown in FIG. 4 upon both the front and rear flexure plates 36 of mounting assembly 12. The result is that, because flexure plates 36 are induced to buckle in the manner shown in FIG. 4, their resistance to moments applied to the mounting assembly about the Z axis is reduced; if the flexure plates are in fact buckled in the manner illustrated in FIG. 4, then the resistance of the flexure plates to moments about the Z axis is nearly eliminated. The ultimate result of these phenomena is that mounting assembly 12 is not as resistant as desired to moments applied thereto about the Z axis and, in use, the mounting assembly responds or tends to respond to such moments to produce variations in the desired corrective angle of skew tracking of the friction wheel 15 along measurement surface 17.

Moments about the Z axis are applied to mounting assembly 12 during operation because of the drag of friction wheel 15 along measurement surface 17; preferably, the force of engagement of friction wheel 15 with measurement surface 17 is on the order of 40 lbs. and this force is concentrated in a very small area of actual physical contact between the wheel and the measurement surface. (Also, moments about the Z axis tend to be generated by reason of the curved profile of the friction wheel and by reason of the presence of the corrective skew tracking angle relative to the direction of gross relative movement of the measuring device along measurement surface 17.) Due to the geometry of mounting assembly 12 and of measuring device 10, it is apparent that the loads applied to the measuring device along the X axis are applied to mounting assembly 12 via a lever arm of relatively large magnitude. The result is that during use mounting assembly 12 is subjected to appreciable moments about the Z axis, and such moments are precisely the type of moments to which the mounting assembly is rendered sensitive by reason of the deflections illustrated in FIGS. 3 and 4.

The susceptibility of mounting assembly 12 to moments about the Z axis may be described best by visualizing the effect in three separate areas 61, 62 and 63 of a flexure plate 36 buckled in response to the condition illustrated by FIG. 3. Consider central columnar strip 61 of flexure plate 36 and end columnar strips 62 and 63 of the flexure plate, and imagine that the portions of the flexure plate between these columnar strips are eliminated so that carrier member 26 is connected at each of its ends to base member 27 by three laterally resilient, thin columns. As carrier member 26 deflects in the manner shown in FIG. 3, strip 61 is placed under tension as the central portion of the carrier member moves upwardly relative to the side portions thereof to which strips 62 and 63 are connected. The result is that strips 62 and 63 are placed under compressive loadings which may readily exceed the critical (Euler) loads of the strips considered as columns, with the result that strips 62 buckle, as shown in FIG. 4. The compressive loads applied to strips 62 and 63 are dependent upon strip 61, disposed centrally between them, being placed in tension. That is, if carrier member 26 were connected to base member 27 only by columnar strips 62 and 63, then deflection of the carrier member as shown in FIG. 3 would not result in any buckling of strips 62 and 63 because the center portion of carrier member 26 could move freely upwardly relative to strips 62 and 63, by hypothesis, however, this cannot be the case because the central portions of carrier member 26 and base member 27 are interconnected at their opposite ends by columnar strips 61. The result is that when carrier member 26 of mounting assembly 12 includes the simple rectangular flexure plates 36 and the carrier plate is deflected as shown in FIG. 3, central strips 61 of the flexure plates behave as fulcrums for angular motion of the carrier member relative to base member 27, and such angular motion is resisted by strips 62 and 63 behaving in much the same manner as column spring 38.

It should be emphasized at this point that FIGS. 3 and 4 constitute gross exaggerations of the effects encountered during the use of mounting assembly 12 and that the end strips of flexure plate 36 may not actually buckle as shown in FIG. 4. The end strips of plates 36, however, are subjected to compressive loadings which reduces their ability to resist moments applied to the mounting assembly about the Z axis, thereby rendering the mounting assembly less resistant than desired to such moments. This means that flexure plates 36 tend to permit actual variations, from moment, to moment, in the corrective skew tracking angle of friction wheel 15 as it rolls during an actual measurement along measurement surface 17, thereby producing errors, albeit slight, in measurement accuracy and measurement repeatability. These errors are eliminated by modifying the structure of the flexure plates for mounting assembly 12 in the manner shown in FIGS. 5 and 6.

Flexure plate 65, shown in FIG. 5 (as well as flexure plate 66, shown in FIG. 6), preferably is defined of thin resilient metal stock which is about 66 to 100 percent thicker than the stock material of which flexure plates 36 are fabricated. Thus, flexure plates 66 and 65 have approximately the same resistance to linear movements of carrier member 26 linearly parallel to the Z axis relative to base member 27 as flexure plates 36.

As shown in FIG. 5, flexure plate 65 has an overall width and height equal to the corresponding dimension of flexure plate 36 and has upper and lower edges 67 and 68, respectively. Flexure plate 65 is configured to define strip sections 69 which extend along the upper and lower edges of the plate. Flexure plate 65 is also configured to define a pair of diverging leg sections 70 which have a common point of connection at 71 to upper strip section 69 at the midpoint of section 69.

Leg sections 70 are connected at spaced locations at their opposite ends to the strip section associated with lower edge 68 of the flexure plate. Preferably, the lower ends of leg sections 70 are connected to the lower strip section approximately midway between the midpoint of the lower strip section and the opposite ends of the flexure plate. A plurality of holes 64 are formed through strip sections 69 at substantially regular intervals along their length. It is preferred that flexure plate 65 be used in lieu of plate 36 at the forward end of mounting assembly 12, i.e., at the end of the mounting assembly which normally is disposed adjacent measurement surface 17.

Flexure plate 66, as shown in FIG. 6, has upper and lower marginal strip sections 69 associated with the upper and lower edges 71 and 72 of this improved flexure plate. In flexure plate 66, strip sections 69 are bounded adjacent the center of the flexure plate by parallel slots 73 formed through the flexure plate. Each of slots 73 has opposite ends 74 which are located inwardly of the adjacent side edges 75 of the plate. Accordingly, flexure plate 66 is configured to define a pair of column portions 76 at each end thereof and a brace portion 77 which extends between slots 73 and interconnects the column portions along their central parts. A plurality of holes 64 are formed through strip sections 69 of flexure plate 66 at regular intervals along the length of the strip portions. Flexure plate 66 preferably is installed in mounting assembly 12 in place of the flexure plate 36 at the rear end of the mounting assembly, i.e., at the end of the assembly which normally is located remote from measurement surface 17.

As shown in FIG. 7, flexure plate 66 is interconnected between carrier member 26 and base member 27 by the use of screws 80 inserted through holes 64 of the plate and threaded into tapped holes provided in the carrier and base members. Preferably a back-up strip 81 is interposed between the heads of screws 80 and the strip sections of the flexure plate to distribute the clamping action of the screws along the length of the strip sections. Flexure plate 65 is similarly mounted between the front ends of the carrier and base members.

It will be apparent from the foregoing description that when mounting assembly 12 is modified by the substitution of flexure plates 65 and 66 thereinto in place of simple rectangular flexure plates 36, the mounting assembly provides three spaced, essentially frictionless points of connection between the base and carrier members. These points of connection are essentially frictionless because the only movement encountered in these points is resilient bending of leg portions 70 or column portions 76, respectively, as carrier member 26 translates relative to base member 27 parallel to the Z axis. Because a three-point connection between the base and carrier members is provided, neither the inverted V column arrangement defined by flexure plate 65 nor the straight column arrangements provided by portion 76 of flexure plate 66 can be subjected to any compressive load by reason of the buckling of carrier member 26 in the manner shown in FIG. 3. The result is that a mounting assembly incorporating flexure plates 65 and 66 is not susceptible to deflection in response to moments applied to it about the Z axis. Accordingly, a mounting assembly incorporating flexure plates 65 and 66 effectively meets the basic objective of providing an assembly which is stiff in five of the six modes of orthogonal motion, but which has a desired softness to the sixth mode of motion. The result is that no variations in the corrective skew tracking angle programmed into the installation by the practice of the method described in U.S. Pat. No. 3,561,120 are encountered as friction wheel 15 rolls along measurement surface 17 during the measurement process.

Preferably, the three points of connection provided between carrier member 26 and base member 27 are distributed geometrically symmetrical about the linear path of motion permitted between the carrier and base members and defined by flexure plates 65 and 66.

From the foregoing description, it is apparent that this invention provides a simple and effective solution to the problem encountered in the structures described in application Ser. No. 67,379. This invention produces an economical solution to this problem because the practice of this invention requires only minor structural modifications to the basic structure of the mounting assembly described in this copending application, rather than wholesale revision of such structure.

This invention may be used to advantage with any friction wheel measuring device in essentially any environment or installation. A lathe has been referred to above merely for the purposes of example. Similarly, it should be understood that the foregoing description has been presented with reference to a presently preferred measuring device manufactured by the assignee of this invention and available commercially under the trademark TRAV-A-DIAL. Workers skilled in the art to which this invention pertains will readily appreciate that this invention may be used to advantage in conjunction with measuring devices other than TRAV-A-DIAL measuring devices and in conjunction with mounting assemblies for such other measuring devices. Accordingly, the foregoing description should not be considered as limiting the scope of this invention to the specific structures illustrated and described, but rather as illustrative of the principles of the invention.

What is claimed is:

1. A mounting assembly for a friction wheel measuring device comprising
   1. a base member adapted to be mounted to one of two relatively movable elements to the other of which the measuring device is to be engaged,
   2. a carrier member disposed adjacent the base member and defining means for releasably clamping a measuring device thereto,
   3. resilient means operatively coupled between the base member and the carrier member for biasing the carrier member relative to the base member along a predetermined path of movement defined for the carrier member, and
   4. flexure means connected between the base and carrier members for defining said path, for restricting relative movement between the base and carrier members to movement only along said path during normal conditions of use of the mounting assembly, and for effectively defining only three spaced, essentially frictionless points of connection between the base and carrier members.

2. A mounting assembly according to claim 1 wherein the path is defined to be linear and the points of connection are disposed effectively symmetrically about the path.

3. A mounting assembly according to claim 2 wherein the points of connection are defined geometrically symmetrically about the path.

4. A mounting assembly according to claim 3 wherein the flexure means comprises a first thin resilient flexure element defining one of the points of connection along the path and connected between adjacent ends of the base and carrier members, and a second thin resilient flexure element connected between the opposite adjacent ends of base and carrier members and defining the other two points of connection on opposite sides of the path.

5. A mounting assembly according to claim 4 wherein the points of connection are defined as columns normal to the path and laterally resilient in directions parallel to the path.

6. A mounting assembly according to claim 5 wherein the respective flexure elements are configured to define means for inhibiting deflection of the columns in the planes of the flexure elements.

7. A mounting assembly according to claim 1 wherein the resilient means is effective to bias the carrier member in one direction along the path relative to the base member with a force which is essentially constant throughout substantial movements between the members.

8. A mounting assembly according to claim 7 wherein the resilient means is defined to operate as an axially loaded column to produce said force.

9. A mounting assembly according to claim 1 wherein the carrier member defines a female dovetail channel aligned with said path for receiving therein cooperatively configured male dovetail projection means carried by the measuring device.

10. A mounting assembly for a friction wheel measuring device having a housing, the assembly comprising
 1. a base member adapted to be mounted to one of two relatively movable elements to the other of which the measuring device is to be engaged,
 2. a carrier member disposed adjacent the base member and defining means for releasably clamping a measuring device thereto,
 3. resilient means operatively coupled between the base member and the carrier member for biasing the carrier member relative to the base member along a predetermined path of movement defined for the carrier member, and
 4. flexure means connected between the base and carrier members for defining said path, for restricting relative movement between the base and carrier members to movement only along said path during normal conditions of use of the mounting assembly, and for effectively defining only three spaced, essentially frictionless points of connection between the base and carrier members.

* * * * *